United States Patent [19]

Tsuchiya et al.

[11] Patent Number: 5,135,382
[45] Date of Patent: Aug. 4, 1992

[54] MOLD FOR FORMING COMPOSITE-MATERIAL STRUCTURES

[75] Inventors: Kiyoshi Tsuchiya; Masaru Honda; Shigeki Takagi; Haruyoshi Saigoku, all of Utsunomiya, Japan

[73] Assignee: Fuji Jukogyo Kabushiki Kaisha, Tokyo, Japan

[21] Appl. No.: 666,393

[22] Filed: Mar. 11, 1991

[30] Foreign Application Priority Data

Mar. 13, 1990 [JP] Japan .................................. 2-62034

[51] Int. Cl.⁵ .......................................... B29C 61/00
[52] U.S. Cl. .................................. 425/330; 425/394; 425/411; 425/451.7; 425/DIG. 129
[58] Field of Search ............... 425/330, 384, 394, 407, 425/411, 451.7, 451.9, DIG. 129

[56] References Cited

U.S. PATENT DOCUMENTS

| | | | |
|---|---|---|---|
| 1,321,125 | 11/1919 | Pfanstiehl | 425/451.7 |
| 1,386,003 | 8/1921 | Kempton | 425/330 |
| 2,442,516 | 6/1948 | Shriver | 425/394 |
| 3,149,374 | 9/1964 | Wagner | 425/DIG. 129 |
| 3,447,205 | 6/1969 | Dorsey | 425/422 |
| 3,682,576 | 8/1972 | Gross | 425/451.9 |
| 3,797,979 | 3/1974 | Greenwood | 425/451.7 |
| 4,889,480 | 12/1989 | Nakamura et al. | 425/451.7 |
| 4,971,543 | 11/1990 | Minor | 425/411 |
| 5,035,591 | 7/1991 | Soeda et al. | 425/411 |

FOREIGN PATENT DOCUMENTS

| | | | |
|---|---|---|---|
| 552861 | 5/1923 | France | 425/330 |
| 55-41210 | 3/1980 | Japan . | |
| 62-267114 | 11/1987 | Japan . | |

Primary Examiner—Jay H. Woo
Assistant Examiner—Scott Bushey
Attorney, Agent, or Firm—Beveridge, DeGrandi & Weilacher

[57] ABSTRACT

A composite-material structure of T-shaped cross section has a horizontal plate and an integral vertical web. The vertical web is formed between opposite forming faces of die members, and the horizontal plate is formed between the die members and a horizontal pressing plate positioned above or below the die members. In order to urge the die members against each other for forming, wedges are provided. The die members, pressing plate and wedges are placed between a lower stationary part and an upper movable part of a pressing machine. When the movable part descends towards the stationary part, the wedges exert forces to the die members to urge the members toward each other due to a wedge action, and the pressing plate is vertically urged against the die members.

12 Claims, 2 Drawing Sheets

MOLD FOR FORMING COMPOSITE-MATERIAL STRUCTURES

BACKGROUND OF THE INVENTION

The present invention relates to a mold for forming composite-material structures without producing strain therein.

Composite materials are being widely used for structural members of aircraft and motor vehicles. Composite-material structures generally require heat and pressure treatment in the forming process. An example of such treatment is an autoclave forming. For fabricating such composite-material structures, a suitable method includes a press-forming method by which forming can be carried out in a short time.

Various press-forming methods have been proposed. For example, a method of fabricating panels is disclosed in Japanese Patent Application Laid-Open Publication No. 62-267,114. A method of integrally forming composite-material structures is disclosed in Japanese Patent Application Laid-Open Publication No. 55-41,210.

The first method of fabricating panels comprises placing a central preformed structure and an outer peripheral preformed structure in a mold, and applying pressure and heat to the structures to form an integral panel. The second method of integrally forming composite-material structures comprises laminating a preformed structure on an elastomer tool, placing the resulting structure in an autoclave, and applying pressure and heat to the structure by utilizing the thermal expansion pressure of the elastomer tool thereby to form an integral structure.

The methods described above, however, are accompanied by the following problems. By the first method of placing a central preformed structure and an outer peripheral structure in a mold, the two structures are fabricated into an integral structure. However, during the forming process, uniform pressure cannot be applied to rising or upstanding portions of the objective structure being formed. By the second method in which an elastomer tool is used, the desired pressure cannot be applied within the required time period. Furthermore, the composite-material structure and the elastomer tool have different thermal expansion coefficient. Consequently, strain is produced in the formed product in some cases.

SUMMARY OF THE INVENTION

The present invention has been made in view of the above described problems. It is an object of the present invention to provide a mold for forming composite-material structures without producing strain therein in such a manner that uniform pressure is applied over the entire surface of each structure in the forming process.

The object has been achieved by using a mold that is made of materials of thermal expansion coefficients which are substantially equal to that of the objective composite-material structure to be formed and by applying pressing force to the composite-material structure in at least two orthogonal directions.

More specifically, according to the present invention, there is provided a mold for forming a composite-material structure having a horizontal plate and a vertical web integrally extending from the plate part perpendicularly thereto, by a pressing machine having a lower horizontal part and an upper horizontal part which are relatively movable vertically toward each other, the mold comprising at least one pair of horizontally shiftable die members disposed side by side and having mutually opposing forming faces that define therebetween a vertical gap in which the vertical web of the structure is positioned for forming; a pressing plate extending horizontally in a vertically adjoining relation to said die members, said pressing plate defining between itself and the die members a horizontal gap in which the horizontal plate of the structure is positioned for forming; the die members and the pressing plate being made of a material having a thermal expansion coefficient substantially equal to that of the structure, at least in the parts of the die members that are in contact with the structure during the forming; vertically movable wedge means disposed in contact with said die members to exert forces to the die members to urge the same toward each other due to a wedge action so as to form the vertical web between said opposing forming faces when the wedge means are moved vertically relative to the die members; the die members, pressing plate and wedge means being positioned between the lower and upper horizontal parts of the pressing machine so that when the two horizontal parts move toward each other, the wedge means is actuated to effect the wedge action to form the vertical web, and the pressing plate is forced against the die members to form the horizontal plate.

In the mold of the present invention, the wedge means are provided to exert forces to the die members. When the wedge means are pressed by the pressing machine, lateral force components are created in accordance with the amount of movement of the wedge means. The lateral force components, together with a force component acting in the direction of the pressing machine action, produce a uniform forming pressure on all parts of the composite-material structure.

Furthermore, those parts of the pressing plate and die members which are to contact the composite-material structure are made of one or more materials having thermal expansion coefficient which are substantially equal to that of the structure. Therefore generation of internal strains in the composite-material structure due to differences in thermal expansion coefficient are prevented.

DESCRIPTION OF THE PREFERRED EMBODIMENTS

Figure 1:
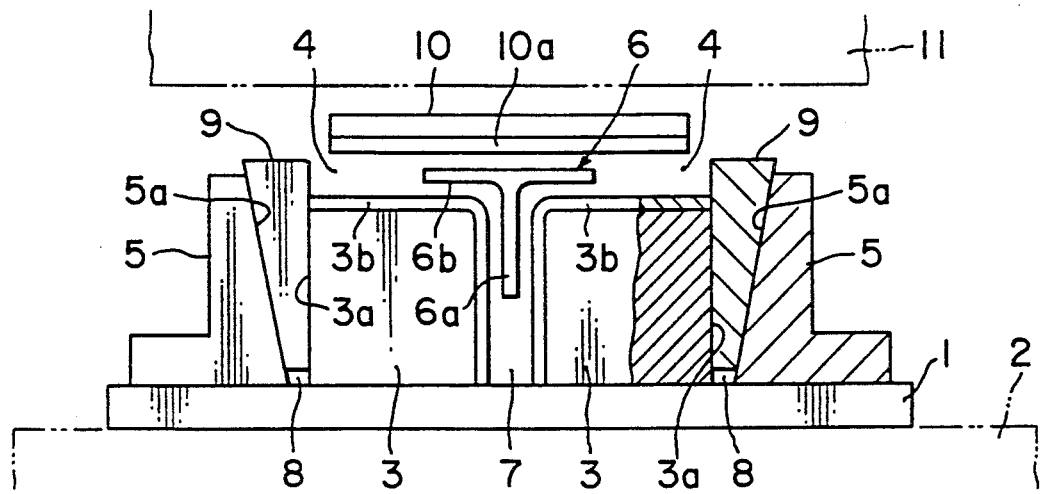
FIG. 1 is an elevational view, partly in section, showing an embodiment of the mold for forming composite-material structures according to the present invention.
Figure 2:
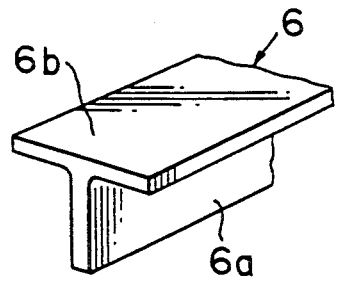
FIG. 2 is a fragmentary perspective view showing a composite-material structure fabricated by the mold according to the present invention.

Referring first to FIG. 1, a mold according to the present invention has a base plate 1. For forming operation, the base plate 1 is placed on a stationary press part 2. Guide members 5, 5 are fixedly mounted on the base plate 1 at spaced-apart positions thereon. The guide members 5, 5 extend horizontally and perpendicularly to the sheet of the drawing. The guide members 5, 5 are so positioned with a space 4 therebetween. Two opposed die members 3, 3 are disposed within the space 4 and extend horizontally and perpendicularly to the sheet of the drawing. The die members 3, 3 are so positioned as to form therebetween a vertically extending gap 7 for accommodating a central leg or vertical web 6a of a composite-material structure or workpiece 6 to be formed, which in this example is an elongated member of a T-shaped cross section. The workpiece 6 has a horizontal top plate 6b.

The guide members 5, 5 have inclined surfaces 5a, 5a on the inner or mutually opposed faces thereof. A wedge-shaped space 8 is formed between each guide member 5 and the nearest die member 3. A wedge 9 is inserted into each wedge-shaped space 8 from above. Each wedge 9 has an inclined surface corresponding to and in contact with the inclined surface 5a of the nearest guide member 5. A side force which can be applied on each die member 3 (i.e., inward force toward the vertical web part 6a of the workpiece 6) is determined by the angle of the inclined surface 5a and the vertical force applied to the upper surface of the wedge 9. The length (vertical dimension as viewed in FIG. 1) of each wedge 9 is made shorter than the depth of the wedge-shaped space 8. Thus a relief space is provided for each wedge 9. The wedge 9 normally extends upwards beyond the upper surfaces of the die members 3. Furthermore, a pressing plate 10 for pressing downwards on the top of the top plate 6b of the workpiece 6 is disposed directly above the workpiece 6. Pertinent dimensions of the parts described above are so designed that a movable part (platen) 11 of the press will press down on the pressing plate 10 and simultaneously on the tops of the wedges 9 in the operation of the mold as described hereinafter.

The pressing plate 10 and the die members 3 constitute essential parts of a forming mechanism of the mold. These essential parts 10 and 3 are formed from materials of thermal expansion coefficients which are substantially equal to that of the composite-material workpiece 6. For example, a carbon-fiber-reinforced plastic may be used for the composite-material workpiece 6. In this case, a low-expansion steel, a ceramic, or carbon is suitable as the material for the plate 10 and the die members 3, 3. In some cases, a material of a thermal expansion coefficient which is substantially equal to that of the composite-material workpiece 6 cannot be selected for the pressing plate 10 and the die members 3, 3. In such a case, the surfaces of the plate 10 and the die members 3, 3 in contact with the workpiece 6 are covered with layers 10a and 3b formed from such a material of a coefficient of thermal expansion which is substantially equal to that of the workpiece 6.

The productivity of the forming work as described hereinunder is increased by providing the die members 3, 3 with heating and cooling apparatus.

The mold according to the present invention is operated in the following manner.

First, the die members 3, 3 are positioned on the base plate 1 in the space 4. Next, the vertical web 6a of the composite-material workpiece 6 is inserted into the gap 7 provided between the inner faces of the die members 3, 3. The pressing plate 10 is then placed on the upper surface of the workpiece 6. Then, the respective wedges 9, 9 are inserted from above into the wedge-shaped spaces 8 formed between the inner inclined surfaces 5a, 5a of the guide members 5, 5 and the outer side surfaces 3a, 3a of the die members 3, 3. Thus, the mounting of the composite-material workpiece 6 in the mold is completed.

The mold is thereupon placed on the stationary part 2 of the press. The press is then operated, whereupon the movable part (platen) 11 thereof descends. The movable part 11 thereby presses the wedges 9, 9 downwards. Consequently, the die members 3, 3 are forced to move away from the fixed guide members 5, 5. Thus the die members 3, 3 exert side forces on the workpiece 6 from the opposite sides thereof. At the same time, a downward pressing force is exerted also on the pressing plate 10. As a result, a forming pressure is applied to the entire outer surface of the workpiece 6.

As stated hereinbefore, the die members 3, 3 and the pressing plate 10 which are in contact with the workpiece 6 have thermal expansion coefficients that are substantially equal to that of the workpiece 6. For this reason, internal strain due to difference in the thermal expansion coefficient is not generated.

Figure 3:
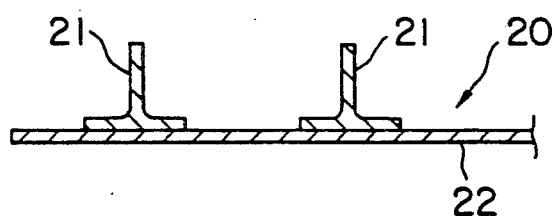
FIG. 3 is a sectional view showing a structure applied with composite-material structure fabricated by the mold of the present invention.
Figure 4:
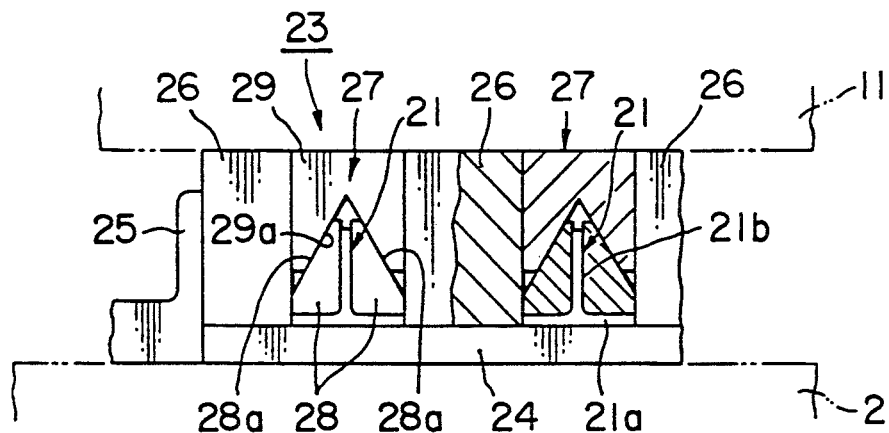
FIG. 4 is an elevational view, partly in section, showing a second embodiment of the mold according to the present invention.

FIG. 3 illustrates an example of a formed structural part 20, which is a reinforced panel. The reinforced panel 20 is fabricated by integrally forming composite-material reinforcing members (stiffeners) 21 of an inverted T-shaped cross section and a composite-material flat plate 22. According to the present invention, the reinforcing members 21 may be fabricated by a mold 23 as shown in FIG. 4. The mold 23 has a pressing plate 24 placed on a stationary press part 2. A pair of guide members 25 (only one guide member shown) are fixedly mounted on the press stationary part 2. Guide blocks 26 are disposed between the guide members 25. A wedge mechanism 27 is disposed between and in contact with each pair of adjacent guide blocks 26. Each wedge mechanism 27 comprises a pair of opposed die members 28, each of triangular cross section, and a counter wedge member 29 having a groove 29a of an inverted V-shaped cross section. The pair of die members 28 are fitted in the groove 29a as shown.

When the reinforcing members 21 are to be fabricated, a composite-material reinforcing member 21 is placed on the pressing plate 24 between each pair of adjacent guide blocks 26 so that a horizontal plate 21a of the reinforcing member 21 is lying flat on the pressing plate 24 with a vertical web 21b extending upwards. The two die members 28 of one pair thereof are placed on the horizontal plate 21a of the reinforcing member 21 on respectively opposite sides of the web 21b and in contact therewith. Two sloping faces 28a of the two die members 28 not in contact with the reinforcing member 21 face away from the web 21b thereof. In combination, these two faces 28a form a convex inverted V-shaped wedge surface corresponding to the above mentioned inverted V-shaped groove 29a of the respective counter wedge member 29.

Each counter wedge member 29 is lowered onto the corresponding V-shaped wedge surface of the die members 28. The movable part 11 of the press then presses downwards on the counter wedge members 29. Opposed side forces due to the resulting wedge action are thus applied on the two opposite sides of the web 21b. At the same time, the web 21b is subjected to a compressive force due to the resulting downward force applied by the die members 28 and the reactive force due to the pressing plate 24. Thus pressure is exerted on the entire surface of the workpiece 21.

Figure 5:
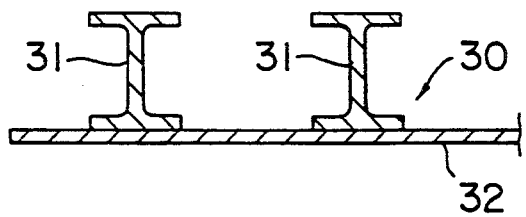
FIG. 5 is a sectional view showing another structure applied with modified composite-material structures fabricated by the mold of the present invention.

Molds for fabricating composite-material structures of T-shaped cross section have been described above. FIG. 5 illustrates still another example of a reinforced panel 30. The reinforced panel 30 is fabricated by integrally forming composite-material stiffeners 31 of H-shaped cross section and a flat composite-material plate 32. The stiffeners 21 can be fabricated by a mold for forming a composite-material structure shown in FIG. 6.

Figure 6:
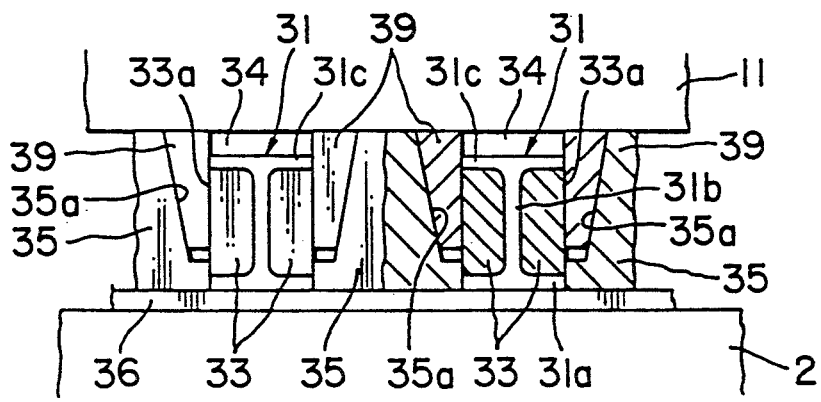
FIG. 6 is an elevational view, partly in section, of a third embodiment of the mold according to the present invention.

The mold shown in FIG. 6 has a base plate 36. For forming operation, the base plate 1 is placed on a stationary press part 2. A guide member 35 is fixedly mounted on the base plate 31 and formed with upwardly divergent spaces or grooves with opposite inclined side surfaces 35a. Two opposed die members 33, 33 are disposed within each groove and extend horizontally. The die members 33, 33 are so positioned as to form therebetween a vertically extending gap for accommodating a vertical web 31b of a composite-material workpiece 31 of H-shaped cross section. The workpiece has a horizontal top plate 31c and a horizontal bottom plate 31a. A wedge-shaped space is formed between each inclined side surface 35a and the nearest die member 33. A wedge 39 is inserted into each wedge-shaped space from above. Each wedge 39 has an inclined surface corresponding to and in contact with the inclined side surface 35a. The length of each wedge 39 is made shorter than the depth of the wedge-shaped space, so that a relief space is provided for each wedge 39. The die members 33 are placed on the bottom plate 31a of the workpiece 31. Furthermore, a pressing plate 34 for pressing downwards on the top of the top plate 31c of the workpiece 31 is disposed directly above each workpiece.

The operation of the mold shown in FIG. 6 is similar to that of the mold shown in FIG. 1.

Because of the features of the mold of the present invention as described above, forming pressure is exerted uniformly on all portions of the composite-material workpiece. Furthermore, the generation of internal strains due to different thermal expansion coefficient is effectively prevented.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. In a mold for forming a workpiece of a composite material between upper and lower parts of a press, which are relatively movable vertically toward and away from each other, said mold having die members placed between said upper and lower parts and being horizontally slidable, vertically movable wedge means for forcing said die members toward each other due to a wedge action so as to form a part of said workpiece between said die members and a pressing plate extending horizontally in vertically adjoining relation to said die members for vertically pressing a part of said workpiece when said upper and lower parts of the press are moved toward each other, the improvement in the mold comprising:

a first layer covering a surface of each of said die members where said workpiece is in contact therewith; and a second layer covering a surface of said pressing plate where said workpiece is in contact therewith;

each of said first layer and said second layer being made of a material having a thermal expansion coefficient substantially equal to that of said workpiece so as to precisely produce a product from said workpiece by uniformly pressing all surfaces of said workpiece without generating internal strain due to different thermal expansion coefficients between said workpiece and said die members and pressing plate.

2. The mold according to claim 1 for forming a T-shaped workpiece, further comprising:

a horizontal base plate disposed on said lower part of the press;

a pair of guide members fixed on said base plate and spaced apart from each other to make a space therebetween, each of said guide members having an inclined surface inclining inwardly;

said pressing plate being disposed over said die members to form a horizontal part of said workpiece;

said wedge means includes a pair of wedges, each of said wedges being disposed between the corresponding guide member and die member and having a top surface to be pressed downwardly by said upper part of the press and an inclined surface in contact with said inclined surface of the guide member to apply an inward force to the die member for forming a vertical part of said T-shaped workpiece while said wedge is moved downwardly.

3. The mold according to claim 2, wherein each of said wedges extends upwards beyond an upper surface of the corresponding die member.

4. The mold according to claim 1 for forming an inverted T-shaped workpiece, wherein said die members are of a wedge shape and have inclined surfaces facing away from each other, said die members being combined to form a triangle in cross section;

said wedge means is a counter wedge having a downwardly directed groove of an inverted triangular cross section, said groove being fitted on said die members of the triangular cross section; and said pressing plate is disposed below a horizontal part of said workpiece.

5. The mold according to claim 4, further comprising:

guide blocks disposed on said pressing plate at both sides of said die members and said counter wedge so as to guide vertical movement of the counter wedge.

6. The mold according to claim 1, wherein a low-expansion steel is used for the first layer and said second layer when a carbon-fiber-reinforced plastic is used for the workpiece.

7. The mold according to claim 1, wherein a ceramic is used for the first layer and said second layer when a carbon-fiber-reinforced plastic is used for the workpiece.

8. The mold according to claim 1, wherein carbon is used for the first layer and said second layer when a carbon-fiber-reinforced plastic is used for the workpiece.

9. In a mold for forming a workpiece of a composite material between upper and lower parts of a press, which are relatively movable vertically toward and away from each other, said mold having die members placed between said upper and lower parts and being horizontally slidable, vertically movable wedge means for forcing said die members toward each other due to a wedge action so as to form a part of said workpiece between said die members and a pressing plate extending horizontally in vertically adjoining relation to said die members for vertically pressing a part of said workpiece when said upper and lower parts of the press are moved toward each other, the improvement of the mold comprising:

said die members and pressing plate being made of a material having a thermal expansion coefficient substantially equal to that of said workpiece with which said die members and pressing plate are in contact during the forming so as to precisely produce a product from said workpiece by uniformly pressing all surfaces of said workpiece without generating internal strain due to different thermal expansion coefficients between said workpiece and said die members and pressing plate.

10. The mold according to claim 9, wherein a low-expansion steel is used for the die members and said pressing plate when a carbon-fiber-reinforced plastic is used for the workpiece.

11. The mold according to claim 9, wherein a ceramic is used for the die members and said pressing plate when a carbon-fiber-reinforced plastic is used for the workpiece.

12. The mold according to claim 9, wherein a carbon is used for the die members and said pressing plate when carbon-fiber-reinforced plastic is used for the workpiece.

* * * * *